United States Patent
Duse (12)

(10) Patent No.: US 6,874,859 B1
(45) Date of Patent: Apr. 5, 2005

(54) SHAFT/ROLLER UNIT FOR TRACKED VEHICLES

(75) Inventor: Enzo Duse, Bologna (IT)

(73) Assignee: Split S.R.L., (IT)

( * ) Notice: Subject to any disclaimer, the term of this patent is extended or adjusted under 35 U.S.C. 154(b) by 0 days.

(21) Appl. No.: 10/182,275

(22) PCT Filed: Mar. 29, 2000

(86) PCT No.: PCT/IT00/00109

§ 371 (c)(1),
(2), (4) Date: Nov. 4, 2002

(87) PCT Pub. No.: WO01/64503

PCT Pub. Date: Sep. 7, 2001

(30) Foreign Application Priority Data

Mar. 3, 2000 (EP) .................................. 00830164

(51) Int. Cl.$^7$ .............................................. B60B 17/00

(52) U.S. Cl. ...................................... 305/136; 305/137

(58) Field of Search ............................. 305/136, 100, 305/137, 124, 139, 195, 194, 13; 301/13.2, 301/40.2; 152/396; 403/359.6; 277/912

(56) References Cited

U.S. PATENT DOCUMENTS

| | | | | |
|---|---|---|---|---|
| 2,080,744 A | * | 5/1937 | Rogers | 474/91 |
| 3,586,398 A | * | 6/1971 | Dadds et al. | 384/418 |
| 3,773,393 A | * | 11/1973 | Story et al. | 305/119 |
| 5,302,012 A | * | 4/1994 | Dester et al. | 305/193 |
| 5,794,940 A | * | 8/1998 | Brueggmann | 277/364 |
| 6,012,784 A | * | 1/2000 | Oertley | 305/137 |
| 6,481,807 B1 | * | 11/2002 | Barani et al. | 305/100 |

FOREIGN PATENT DOCUMENTS

| | | | |
|---|---|---|---|
| DE | 852044 C | | 10/1952 |
| DE | 7638967 A | * | 4/1977 |
| DE | 7638967 | | 4/1997 |
| RU | 2003558 | | 11/1993 |
| RU | 002152488 A | * | 9/1994 |

* cited by examiner

Primary Examiner—Frantz F. Jules
(74) Attorney, Agent, or Firm—Sofer & Haroun, LLP

(57) ABSTRACT

A shaft/roller unit for tracked vehicles which has a long life and resistance to wear is formed by a shaft (54) which has a shoulder (55) in its central portion, perpendicular to its axis, and onto which two wholly hardened steel half-rollers (56, 57) are fitted, one on each side of the shoulder, with the interposition of antifriction bushings (58, 59), the half-rollers grasping the shoulder (55) and, when they have been welded together along a mating contact and locating surface (60), forming a unitary roller which has a predetermined axial position on the shaft and can withstand considerable axial stresses.

8 Claims, 2 Drawing Sheets

SHAFT/ROLLER UNIT FOR TRACKED VEHICLES

FIELD OF THE INVENTION

The present invention relates to a shaft/roller unit for tracked vehicles such as tractors, excavators and self-propelled machines in general.

BACKGROUND OF THE INVENTION

In these machines, the tracks constitute a pair of steering tracks with large surfaces for bearing on the ground, the arrangement of which on the ground is changed by the operation of toothed drive wheels which engage the tracks, whilst the weight of the vehicle, which is often considerable, is supported by lower support rollers which are free to rotate on upper sides or running surfaces of the portions of the tracks which are bearing on the ground.

Further, upper rollers, on the other hand, have the function of guiding the return portions of the tracks which are not bearing on the ground.

When the tracked vehicle is in motion, the rollers rotate with the tracks by friction, with a considerable component of sliding and impact friction due to the discontinuity of the links and to the different relative attitudes of the portions of track formed by the links, which are not generally perfectly aligned.

This leads to considerable wear of the tracks and of the support and guide rollers, further aggravated by the environment in which these machines have to operate which causes loose and highly abrasive earthy material to be carried along and interposed between the tracks and the rollers.

The structure of the shaft/roller units for tracked vehicles is therefore conditional upon the need to satisfy and to reconcile to some extent different requirements imposed by the operating conditions:

- the rollers should be particularly wear-resistant and easily replaceable,
- the axial positioning of the rollers on the shaft should be ensured by restraints which can withstand the considerable axial thrusts which develop not only when the tracked vehicle has to change its direction of travel or to rotate about itself, but also when the machine discharges onto the tracks, stresses oriented transversely relative thereto, in working conditions;
- with regard to the considerable loads to be withstood, the kinematic coupling between the movable roller and the fixed shaft should provide adequately lubricated bearings (bushings) protected by seals (also replaceable) which prevent leakage of lubricant, on the one hand, and infiltration of abrasive earthy substances into the coupling, on the other hand;
- in order to reduce the contact area and the sliding speed of the seals, they should have as small a diameter as the size of the shaft allows, particularly in shaft/roller units used on tractors for which the speed of movement, and hence the speed of the rollers, is quite fast, with working cycles of considerable, almost continuous, duration during movement.

Various arrangements have been proposed to satisfy and reconcile these requirements and all are based on a structural concept which provides for replaceability solely of the rollers or even solely of their peripheral portions.

The cost of this is structural complications which greatly increase the cost of the unit, make replacement operations onerous, and in any case are at least partially detrimental with regard to other requirements.

These problems are completely overcome by the shaft/roller unit for tracked vehicles of the present invention which, since it is based on the criterion of providing for replaceability and exchange of the entire shaft/roller unit, achieves considerable structural simplifications and substantial reductions in cost and ensures a particularly long useful life of the unit, much longer than that of most units of the prior art.

SUMMARY OF THE INVENTION

According to the present invention, which also relates to the method of manufacture, these results are achieved by a shaft/roller unit constituted by a shaft which has a shoulder in its central portion, and on which two axially drilled half-rollers are fitted, one on each side of the shoulder, the half-rollers having flanged antifriction bearings which extend around the shaft and are in abutment with the shoulder.

After they have been fitted on the shaft, the two half-rollers are welded together to form a unitary roller which grasps the shoulder and is coupled to the shaft in a captive manner, in a predetermined axial position thereof.

This structure achieves the following results:

- the two half-rollers can be hardened entirely and separately before assembly, which ensures a longer life of the roller,
- the unit has good resistance to axial stresses without structural complications or increases in size at the ends of the shaft, and
- it is possible to use annular seals which are arranged in close proximity to the shaft and have small diameters and hence a small friction area and a low sliding speed, so that they can also be used on relatively fast tracked vehicles such as tractors.

BRIEF DESCRIPTION OF THE DRAWINGS

The characteristics and the advantages of the invention will become clearer from the following description, given with reference to the appended drawings, in which.

DETAILED DESCRIPTION OF THE INVENTION

For a better understanding of the invention, it is appropriate to examine closely the various technical arrangements which have been adopted up to now.

Figure 1:
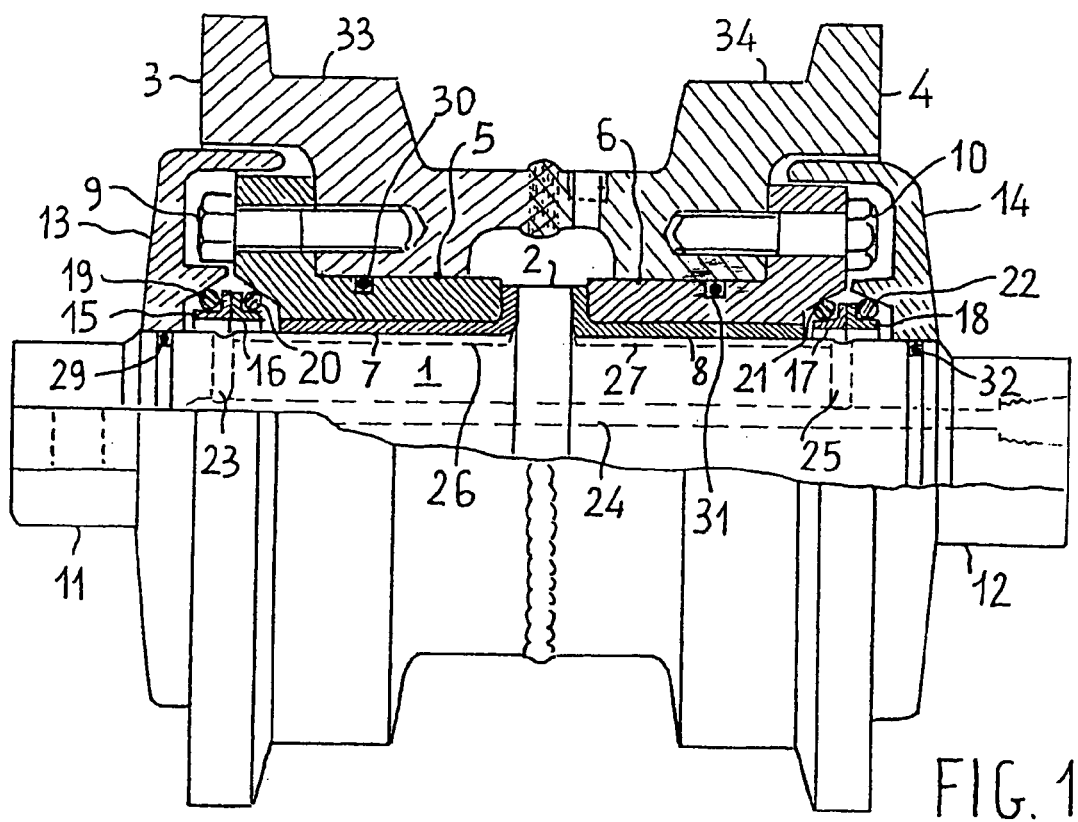
FIG. 1 is a combined front view and section showing a first shaft/roller unit of the prior art.

FIG. 1 shows, in a combined front view and diametral section, a shaft/roller unit for tracked vehicles of the prior art.

The unit comprises basically, a cylindrical shaft 1 having an abutment shoulder 2, a pair of half-rollers or rims 3, 4, and a pair of flanged hubs 5, 6.

The two rims, which are arranged reflectively symmetrically in axial alignment with one another, are welded together to form a unitary element, that is, a roller body, shaped generally as an axially hollow reel with the sides recessed to house the flanges of the respective hubs which are housed with their cylindrical portions in the axial cavity of the hollow body.

The two hubs 5, 6 are fitted on the shaft 1, one on each side of the shoulder 2, with the interposition of bushings 7, 8 in the form of flanged cylindrical bushes.

The flanged portions of the two bushings are interposed between the shoulder 2 and respective hubs 5, 6.

The two hubs are fixed to respective rims 3, 4 which form the roller, by means of a plurality of bolts such as 9, 10, which extend through the flanges of the hubs and are screwed into threaded seats in the rims.

The inside diameter of the roller body is advantageously larger than the outside diameter of the shoulder of the shaft 2 so that it can be slid off the shaft after disconnection from at least one of the hubs whereas, when the hubs are clamped onto the roller body, the assembly of the roller body and the hubs forms a pincer which grasps the shoulder so that the assembly is forced into a predetermined axial position and can withstand considerable axial stresses without translation on the shaft. It can also rotate, together with the bushings 7, 8, on the shaft 1 which is normally fixed and anchored to the side members or to fixed structures of the tracked vehicle by means of end supports 11, 12, generally in the form of saddles each provided with a respective profiled bell or casing 13, 14 which is engaged on the shaft and has the combined function, by adaptation of its profile to that of the sides of the roller, of forming a chamber for housing seals and a labyrinth which prevents, or at least limits, infiltration of extraneous substances between the casing and the roller.

The seals are constituted by pairs of juxtaposed metal rings 15, 16 and 17, 18 with L-shaped cross-sections. Rings 19, 20, 21, 22 of resilient material and of suitable, generally oval or circular cross-section (O-rings), interposed, respectively, between the rings 15, 18 and the casings 13, 14, and between the rings 16, 17 and the hubs 5, 6, keep the rings 15, 16 and 17, 18 in close sealing contact, dividing the chambers housing the seals into two hermetically separated compartments.

The resilient rings also ensure by friction that the rings 16, 17 of the two seals rotate together with the hubs 5, 6 and that the rings 15, 18 remain stationary together with the casings 13, 14 and the shaft 1.

To prevent rapid wear of the bushings 7, 8 and of the rings of the seals, suitable lubrication is required and is ensured, for example, by ducts 23, 24, 25 which are formed in the shaft 1, and by means of which high-density oil can be conveyed into the compartments disposed between the shaft 1 and the resilient rings.

Two axial grooves 26, 27 formed in the upper portion of the shaft enable the lubricant to be distributed throughout the length of the bearings 7, 8 without altering the distribution of the load-bearing hydraulic pressures which are developed in the lower portion of the kinematic coupling between the shaft and the bushing when the roller is in rotation.

Figure 2:
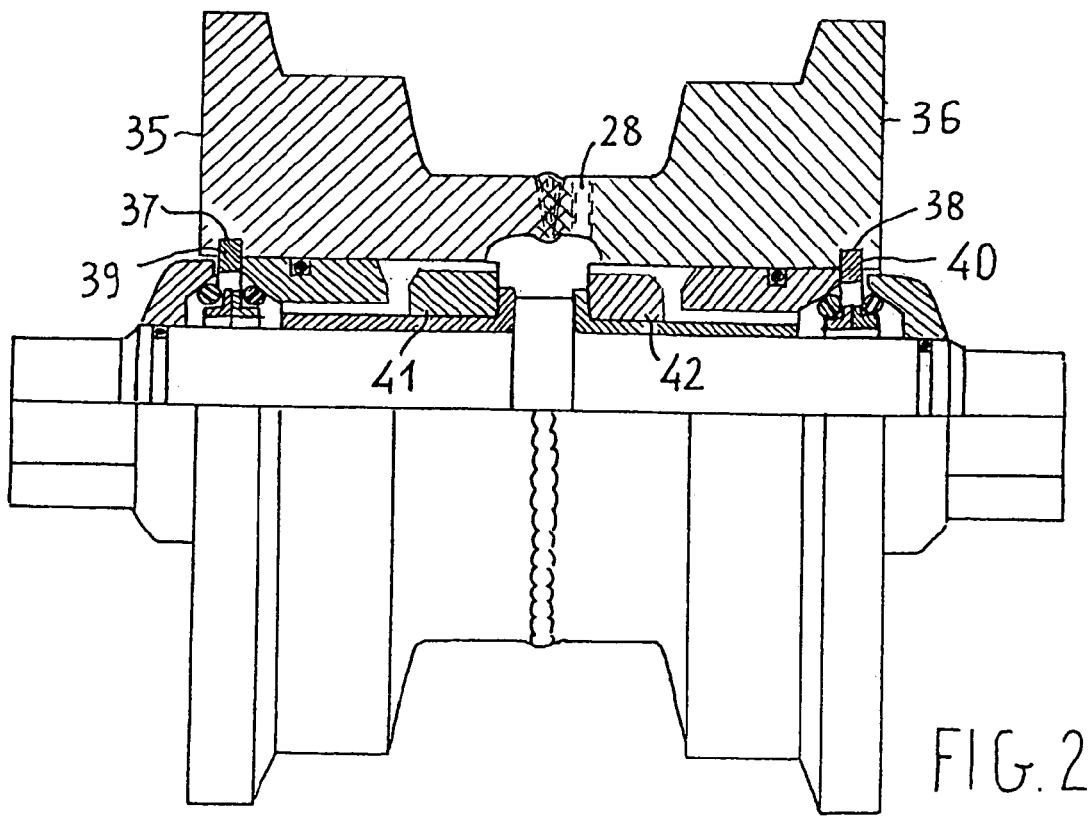
FIG. 2 is a combined front view and section showing a second shaft/roller unit of the prior art.

Alternatively or additionally, the lubricant may be distributed by means of channels formed in the hubs, as shown in FIG. 2 which will be discussed below, and may be supplied through an opening 28 which is closed by a plug and is formed in one of the rims constituting the roller, and which communicates with an internal cavity of the roller opening towards the hubs and towards the shoulder of the shaft.

With further reference to FIG. 1, the structure of the shaft/roller unit is completed by seals such as O-rings 29, 30, 31, 32 which are housed in suitable annular grooves formed in the shaft 1 and in the hubs 5, 6, and which form a seal against oil leakage in the coupling between the hubs 5, 6 and the rims 3, 4 and in the coupling between the casings 13, 14 and the shaft 1.

The shaft/roller unit described above has severe limitations of durability due basically to wear of the running surfaces 33, 34 for the tracks, which tends to reduce the thickness of the rims.

A hardening treatment, for example, by induction localized on the running surfaces, confers greater hardness and hence abrasion resistance. This measure increases useful life and is more beneficial the greater is the depth of penetration of the hardening. Once the hardened thickness of the running surface, which is of the order of 10–20 millimeters, has been worn away, wear proceeds rapidly in a dangerous and unpredictable and hence uncontrollable manner which depends on operative conditions.

To prevent this problem, hardening of the rims in their entirety would be desirable and can be achieved by special processes and with suitable material (for example, a suitable steel).

Hardening of the rims in their entirety, whether it is performed before or after the two rims are welded together, in any case inevitably causes deformation of the roller which has to be corrected by subsequent mechanical machining.

Machining which is necessary in any case is drilling to form the threaded seats for the bolts 9, 10.

To prevent this problem and to simplify the structure to a certain extent, it has been proposed, as described in U.S. Pat. No. 5,553,931 and illustrated in FIG. 2, to eliminate the bolts for clamping the hubs, replacing them with split rings (Seeger or Benzing rings).

In FIG. 2, the solid rims 35, 36, welded together, may be subjected to a total hardening treatment which, in objects of such considerable mass, does not reach the core but increases the depth of hardening thereof so as to achieve a hardness of up to more than 45 Rockwell C even 20 mm from the surface.

The only mechanical machining to which the roller body formed by the two rims 35, 36 has to be subjected is in fact the drilling of the axial hole (with a diameter larger than the outside diameter of the shoulder of the shaft) for housing two hubs 41, 42, and the turning of two seats 37, 38 for two split rings 39, 40 for clamping the two hubs 41, 42 which, in this case, have the shape and function of sleeves of suitable thickness and length for centring the roller body on the shaft and positioning it axially.

With this arrangement, the useful life of the roller is considerably increased (greater hardness even within the material, greater useful thickness of the running surfaces) but, otherwise, the structure of the unit is similar to that of the unit of FIG. 1 and shares its structural complexity; the hubs 41, 42 have to be machined accurately for coupling with the bushings on one side and with the roller body on the other. Their length also has to be calibrated to ensure that the roller body is positioned axially on the shaft in accordance with the clearances calculated and that it is clamped by the split rings. The machining has to be particularly accurate because it is necessary to take account of the sum of several tolerances relating to the length of the hubs, to the thickness of the split rings, to the distance between the grooves housing the split rings as well as, naturally, to the thickness of the flanged bushings and of the shoulder of the shaft.

To reduce the complexity of this structure, it has also been proposed to eliminate the shoulder of the shaft and to achieve the axial positioning of the roller by other means.

Figure 3:
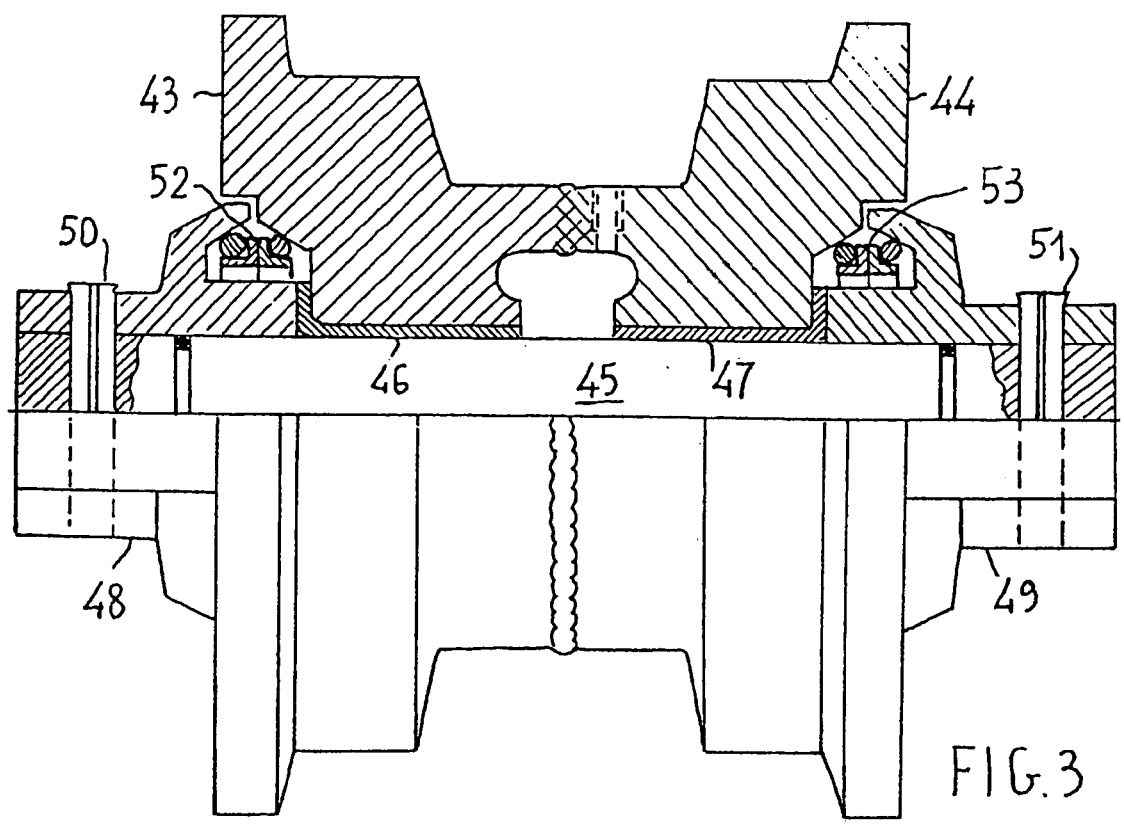
FIG. 3 is a combined front view and section showing a third shaft/roller unit of the prior art.

As shown in FIG. 3, a roller constituted by two rims 43, 44 is fitted directly on a cylindrical shaft 45 without any shoulder, with the interposition of two flanged bushings 46, 47 pressed directly into the axial hole in the roller with the flanges housed and bearing in suitable recesses on the sides of the roller.

Axial positioning on the shaft is ensured by two lateral supports 48, 49 each of which forms a sleeve which is fitted on a respective end of the shaft 45 and is urged into abutment with the flanged portion of the respective bushing 46, 47.

The lateral supports 48, 49 are fixed to the shaft axially by means of pins 50, 51 extending through suitable seats formed in the supports and in the shaft 45.

The arrangement of FIG. 3, a variant of which is descried in U.S. Pat. No. 5,251,913 (the lateral supports are cups closed at the ends, forced onto the shaft and kept in position by the fixed structures to which they are anchored) is further simplified in comparison with that of FIG. 2, at least by the elimination of the hubs, but has the very serious disadvantage that the seals, generally indicated 52, 53, cannot be arranged flush with the periphery of the shaft and are greatly spaced therefrom to allow the sleeves of the lateral supports, which have to have an adequate thickness, to come into abutment with the flanges of the bushings.

For a given angular velocity of rotation, the larger diameter of the seals leads to a greater speed of relative sliding between the rings of the seals, a larger friction surface, a higher coefficient of friction and, finally, heating incompatible with the use of the unit in fast, self-propelled machines such as tractors or graders operating, with reference to movements on the ground, with practically continuous working cycles.

Moreover, the lateral supports and the ends of the shaft have a somewhat larger size than in the previous arrangements which is not acceptable in many applications.

The greater structural simplicity is thus detrimental with regard to other requirements.

The common element of the arrangements described is that, in all cases, the roller can be removed from the shaft in order to be replaced, which inevitably involves laborious dismantling and reassembly operations in the course of which it is quite difficult for components of the unit other than the roller to be reused.

Figure 4:
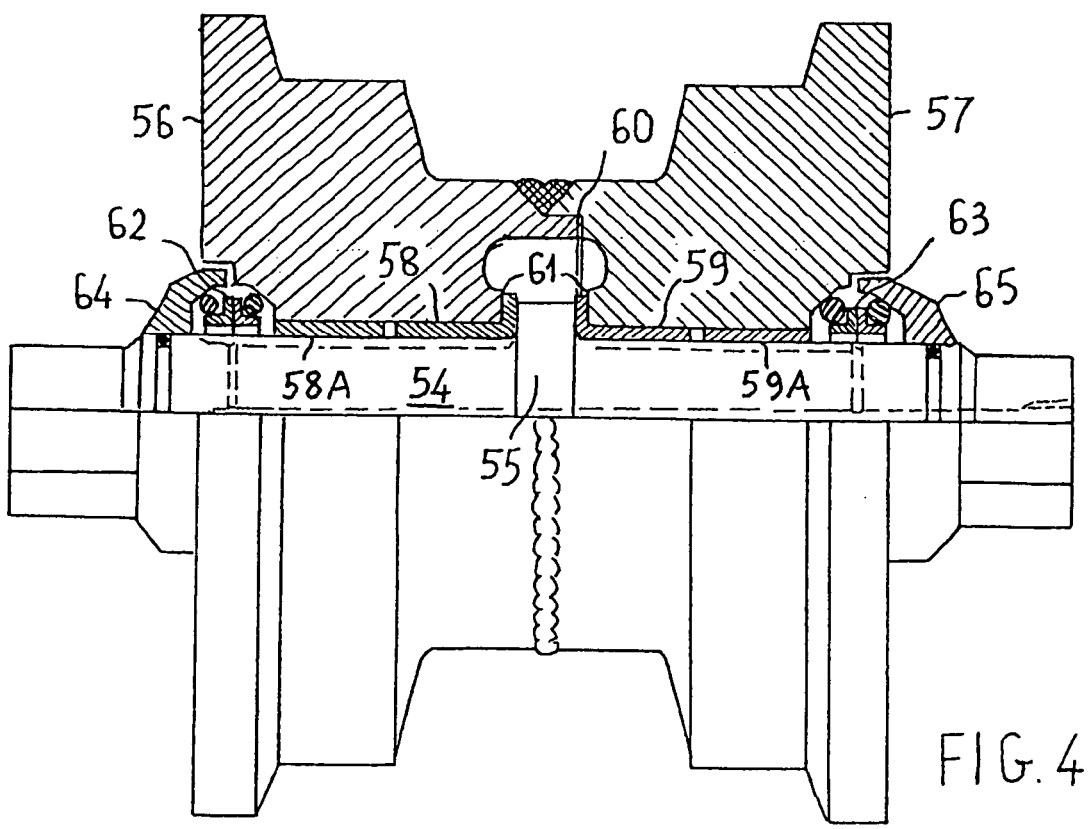
FIG. 4 is a combined front view and section showing a shaft/roller unit formed in accordance with the present invention.

The fact that the unit can be dismantled into parts in order to replace only the worn components thus constitutes a technical disadvantage which has been overcome, permitting the production, according to the present invention, of a greatly simplified shaft/roller unit shown in FIG. 4.

The unit of FIG. 4 comprises, basically, a cylindrical shaft 54 having an abutment shoulder 44 in its central portion and a pair of axially drilled half-rollers or rims 56, 57 fitted directly on the shaft 54, one on each side of the abutment shoulder, with the interposition solely of a pair of flanged bushings or antifriction bearings 58, 59, the flanges of which are in abutment with the shoulder 55.

The diameter of the axial hole in the half-rollers 56, 57 is smaller than the outside diameter of the shoulder 55 of the shaft so as to offer an adequate bearing and thrust surface for the flanged portions of the bushings.

The two half-rollers are preferably coupled in the median plane of the resulting roller, perpendicular to its axis, along a cylindrical, male-female mating mutual locating surface 60.

They also have, in their coupling sides, respective recesses 61 for housing the shoulder 55 of the shaft and the end flanges of the bushings 58, 59 so that the flanged ends of the bushings 58, 59 can be brought into abutment with the shoulder of the shaft when the two half-rollers 56, 57 are side by side and located by the coupling surface.

Welding along the periphery of the mating contact surface 60 of the two half-rollers, thus positioned relative to one another, forms a unitary roller which is coupled kinematically with the shaft and at the same time is restrained in a predetermined axial position thereon, with the ability to withstand considerable axial stresses exchanged with the shaft.

The necessary seals, generally indicated 62, 63, are identical or similar to those already described with reference to FIG. 1 or FIG. 2 and do not require further explanation. It will be noted merely that they are arranged in close proximity to the surface of the shaft 54, housed in chambers which are formed in recesses in the sides of the roller constituted by the rims 56, 57 and are closed by casings 64, 65 similar to those already described with reference to FIG. 2.

The bushings and the seals are lubricated by shaft ducts and possibly grooves, as in the case of FIG. 1.

According to the present invention, the following production method may be implemented to produce the unit of FIG. 4.

First of all, the two half-rollers 56, 57 to be coupled together are produced separately by forging (moulding) of steel.

Then, only if the desired dimensions are not achieved during the forging, the two half-rollers are shaped roughly by a mechanical turning process to bring them to a first level of finishing.

The two separate parts are then hardened in their entirety, bringing their hardness to more than 50 Rockwell C.

The two separate and hardened half-rollers are machined further, again separately, to correct the deformations caused by the hardening.

In particular, the mating coupling surfaces 60, the axial hole for housing the bearings, and the depths of the recesses 61 are corrected to ensure the correct dimensions for housing the shoulder 55 of the shaft and the flanged portions of the bushings 58, 59.

These are the only finishing operations required to achieve the desired tolerances of the two hardened parts.

At this point, the bushings 58 and 59 are pressed into the respective seats with the flanged portions facing towards the coupling faces of the two half-rollers. This operation is possible because the two half-rollers are still separate.

In this connection, it should be pointed out that each of the bushings 58, 59 may advantageously be constituted by two portions, a flanged portion 58, 59, which is pressed in as already stated, and a cylindrical portion 58A, 59A which is pressed in the opposite side of the housing; this makes the insertion of the bushings even easier.

With the bushings inserted, the two half-rollers are fitted on the shaft 54, one on each side of the shoulder 55, until the flanged portions of the bushings are brought into contact with the shoulder 55.

The mating locating surface 60 ensures the correct alignment of the two half-rollers and ensures that the axial clearance of the shoulder between the bearings is within the tolerances set.

The locating function could also be performed by the shaft itself if the clearance of the bearings were kept within minimum values, which condition is possible for rollers which are subject to little loading transversely relative to the shaft.

Once the two half-rollers are coupled, they are welded along the mating contact surface by known welding techniques, for example, flush welding with the addition of weld material or even plasma welding.

The unit is then completed, in conventional manner, by the necessary seals and protective casings.

The replacement of worn rollers involves the replacement of the entire shaft/roller unit, the overall cost of which, however, is much less, owing to its structural simplicity, than the sum of the costs resulting from operations to dismantle and reassemble the units of the prior art, replacing only the worn parts.

Although the drawings relate to rollers with single rims, naturally, the invention is not limited to rollers of this type but also applies to rollers with double rims.

In order to satisfy contingent and specific requirements, an expert in the art may apply to the above-described preferred embodiment of the shaft/roller unit many modifications, adaptations and replacements of elements with other functional equivalent elements without, however, departing from the scope of the following claims.

What is claimed is:

1. A shaft/roller unit for tracked vehicles including excavators and tractors, said shaft/roller unit comprising:
    a roller formed by a pair of axially drilled half-rollers hardened in their entirety, bringing their hardness to more than 50 Rockwell C, and welded together in the median plane of the roller, perpendicular to its axis by means of flush welding with the addition of welded material, each of said half-rollers being fitted on a shaft with the sole interposition of a pair of antifriction bearings;
    the shaft having a shoulder in its central portion, for abutment by the antifriction bearings, and the shoulder having an outside diameter larger than the diameter of the shaft, wherein the axial hole in the half-rollers having a diameter smaller than the outside diameter of the shoulder, wherein the half-rollers have a first recess in the central portion of the roller for housing the shoulder and wherein end flanges of each antifriction bearing are directly in abutment with respective half-rollers on either side of the shoulder so as to enforce a predetermined axial position of the roller on the shaft, and providing for replaceability and exchange of the entire shaft/roller unit.

2. A unit according to claim 1, in which the half-rollers are made entirely of hardened steel.

3. A unit according to claim 1, in which the half-rollers have respective mating mutual locating surfaces.

4. A unit according to claim 1, in which the axially opposed faces of the roller have recesses for housing seals arranged flush with the peripheral surface of the shaft.

5. A method of forming a replaceable shaft/roller unit for tracked vehicles including excavators and tractors, comprising the following steps:
    separate forging of two steel half-rollers to be coupled with one another along a median plane of the roller, perpendicular to its axis,
    hardening of the two separate half-rollers in their entirety bringing their hardness to more than 50 Rockwell C,
    mechanical finishing of the two separate and hardened half-rollers,
    pressing of bushings directly into each of the two separate half-rollers,
    fitting of the two half-rollers each carrying one of said bushings onto a shaft, one on each side of a central shoulder of the shaft so that end flanges of each bushing is in direct abutment with respective half-rollers on either side of said shoulder, until mating coupling surfaces of the two half-rollers are brought into contact, and
    welding the two half-rollers along the mating surfaces, by means of flush welding with the addition of weld material.

6. A method according to claim 5, in which, after the forging stage, a further mechanical rough shaping stage is provided for removing shavings from the two separate half-rollers, forming a mating surface for the coupling of the two half-rollers.

7. A method according to or claim 6, in which the mating surface for the coupling of the two half-rollers comprises a cylindrical surface for the mutual location of the two half-rollers.

8. A unit according to claim 1, wherein each antifriction bearing comprises:
    a first, flanged cylindrical bush which is pressed into the axial hole in the respective half-roller and into the first recess; and
    by a second cylindrical bush which is pressed into the axial hole from the opposite side of the respective half-roller.

* * * * *